United States Patent
Boyd et al.

(10) Patent No.: US 7,473,178 B2
(45) Date of Patent: Jan. 6, 2009

(54) GLOBAL CONTENT MANAGEMENT OVER NETWORK FOR GAMING MACHINE

(75) Inventors: Scott Boyd, Reno, NV (US); Miles Patceg, Reno, NV (US); Perry Cobb, Reno, NV (US)

(73) Assignee: IGT, Reno, NV (US)

( * ) Notice: Subject to any disclaimer, the term of this patent is extended or adjusted under 35 U.S.C. 154(b) by 365 days.

(21) Appl. No.: 11/100,186

(22) Filed: Apr. 5, 2005

(65) Prior Publication Data

US 2005/0261063 A1   Nov. 24, 2005

Related U.S. Application Data

(60) Provisional application No. 60/560,415, filed on Apr. 7, 2004.

(51) Int. Cl.
A63F 9/24 (2006.01)
(52) U.S. Cl. .......................... 463/25; 463/42
(58) Field of Classification Search ............... 463/30, 463/35, 42, 43
See application file for complete search history.

(56) References Cited

U.S. PATENT DOCUMENTS

| | | | |
|---|---|---|---|
| 4,856,787 A | 8/1989 | Itkis | |
| D379,202 S | 5/1997 | Takemoto et al. | |
| 5,655,961 A | 8/1997 | Acres et al. | |
| 5,717,923 A | 2/1998 | Dedrick | |
| 5,724,106 A * | 3/1998 | Autry et al. | 348/734 |
| 5,951,397 A | 9/1999 | Dickinson | |
| 6,003,013 A | 12/1999 | Boushy et al. | |
| 6,061,693 A | 5/2000 | Carney et al. | |
| 6,071,190 A * | 6/2000 | Weiss et al. | 463/25 |
| 6,113,495 A | 9/2000 | Walker et al. | |
| 6,190,254 B1 | 2/2001 | Bennett | |
| D445,841 S | 7/2001 | Sabo | |
| 6,293,866 B1 | 9/2001 | Walker et al. | |
| 6,315,666 B1 | 11/2001 | Mastera et al. | |
| 6,319,125 B1 | 11/2001 | Acres | |
| 6,368,216 B1 | 4/2002 | Hedrick et al. | |
| 6,466,274 B1 | 10/2002 | White | |
| D465,531 S | 11/2002 | Luciano, Jr. et al. | |
| 6,511,377 B1 | 1/2003 | Weiss | |

(Continued)

FOREIGN PATENT DOCUMENTS

AU    704691    4/1999

(Continued)

OTHER PUBLICATIONS

British Examination Report dated May 22, 2007, for related British Patent Application No. 0620780.7.

(Continued)

*Primary Examiner*—Robert E. Pezzuto
*Assistant Examiner*—O. Deodhar
(74) *Attorney, Agent, or Firm*—Weaver Austin Villeneuve & Sampson LLP

(57) ABSTRACT

A content manager feature includes global controls, e.g., volume and display contrast across the entire floor. The program shows prompts including configuring graphical screens with a system variable laid over the display such as player-preferred name. The content manager, the calendar, and anything else appearing on the touch screen are displayed with key pad, touch screen, or on the game screen with or without touch controls.

10 Claims, 18 Drawing Sheets

U.S. PATENT DOCUMENTS

| | | |
|---|---|---|
| D473,899 S | 4/2003 | Munoz et al. |
| 6,866,587 B1 * | 3/2005 | Lane .......................... 463/43 |
| 7,186,181 B2 * | 3/2007 | Rowe .......................... 463/42 |
| 2002/0082084 A1 * | 6/2002 | Snow et al. ................... 463/42 |
| 2002/0133314 A1 * | 9/2002 | Shibata ...................... 702/184 |
| 2002/0142825 A1 | 10/2002 | Lark et al. |
| 2002/0142846 A1 | 10/2002 | Paulsen |
| 2003/0054881 A1 | 3/2003 | Hedrick et al. |
| 2003/0109307 A1 | 6/2003 | Boyd |
| 2005/0215310 A1 | 9/2005 | Boyd et al. |

FOREIGN PATENT DOCUMENTS

| | | |
|---|---|---|
| EP | 0769769 A1 | 4/1997 |
| EP | 1363252 | 11/2003 |

OTHER PUBLICATIONS

British Examination Report dated Jan. 8, 2008, for corresponding British Application No. 0620780.7.

International Search Report and Written Opinion Of The International Searching Authority dated Oct. 24, 2004, for corresponding PCT Application No. PCT/US05/11467.

British Examination Report dated Jul. 25, 2008 from corresponding British Application No. 0620780.7 [IGT1P324GB].

* cited by examiner

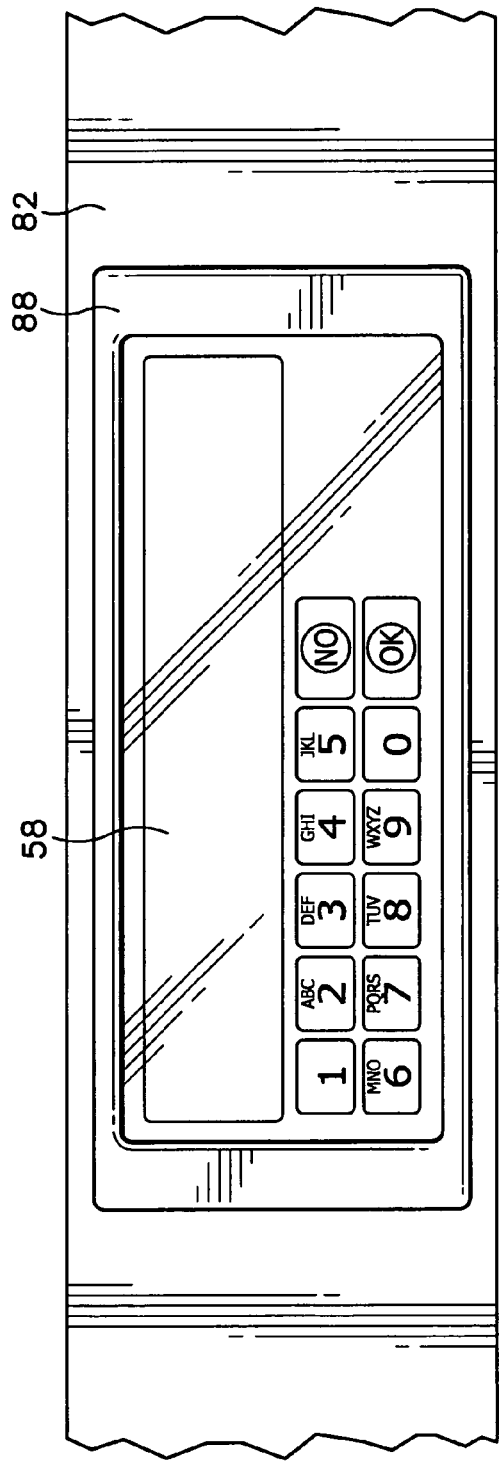

General Screen

Global Volume Settings

Global Contrast Settings

Global Language Settings

Global Animation Settings

Login Screen

Screens Screen

Idle Attract Screen

Idle Attract Parameters

Busy Attract Screen

Session Attract Screen

GLOBAL CONTENT MANAGEMENT OVER NETWORK FOR GAMING MACHINE

CROSS-REFERENCES TO RELATED APPLICATIONS

This application claims the benefit from U.S. Provisional Patent Application No. 60/560,415 filed Apr. 7, 2004 whose contents are incorporated herein for all purposes.

BACKGROUND OF THE INVENTION

1. Field of the Invention

This invention relates generally to electronic gaming machines and more particularly to a method and apparatus for controlling the content and operation of such machines over a network from a central configuration workstation.

2. Description of the Prior Art

Incorporating casino slot machines into a computer network is well known. Early in the deployment of such networks, preexisting slot machines were retrofitted by installing a communications board that included a processor, memory and other components that facilitated communications between the electronic slot machine and the network. When so configured, transactions at one of the slot machines could be communicated via the board onto the network and from there to a computer that stored the transactions for later analysis and verification. Conversely, the network computer can issue commands onto the network that are addressed to a particular machine or a group of machines. The communications board receives the command and communicates with the slot machine to effect, for example, payment of a bonus over and above the pay table in the slot machine as described in U.S. Pat. No. 5,655,961, which is owned by the assignee of the present application and which is incorporated herein by reference for all purposes.

In addition to the communications board, it is well known to install a card reader, a display, and a keypad at each slot machine to facilitate player tracking, as it is referred to in the industry. In a conventional player-tracking system, each player is assigned a card and an associated account, which is maintained on a network computer. Before playing one of the slot machines, the player inserts his or her card to cause points proportionate to play to accrue in his or her account. The points are then redeemable by the player for additional play, dinners, merchandise, or the like. In addition, the card, keypad and display, which is typically a vacuum fluorescent display or a small-character LCD display, can be used to permit a player to access a cashless play account or to access credits that are either complimentary or awarded to the player during the course of his or her play.

The design, construction and operation of networked slot machines, including the card reader, the keypad and the display, as mentioned above, is described in detail in the '961 patent. Another embodiment is also described in U.S. Pat. No. 6,319,125 (the '125 patent) for a Method and Apparatus for Promoting Play on a Network of Gaming Devices, which is also assigned to the assignee of the present application and which is also incorporated herein by reference for all purposes.

While content on gaming machines is one important aspect of networked gaming machines, their general operation—for instance sound volume, display contrast and brightness control—is also an important aspect of game play. These parameters are often controlled locally by adjusting volume and display values at the machines themselves. With hundreds or even thousands of gaming machines on a casino floor, however, adjustment of some subset or all of the machines is often a time intensive operation.

Accordingly, the need remains for systems and methods for adjusting these parameters in a group-selective manner.

SUMMARY OF THE INVENTION

The invention comprises a global content manager system operable within an environment consisting of a plurality of gaming machines coupled together over a network. The content manager system includes a content manager having operating thereon a program including a plurality of selectable operating criteria. Selection means, coupled to the content manager, is operative to select one or more of the gaming machines and one or more operating criteria associated with the gaming machines. Further included are means for changing the operating criteria associated with the gaming machines and packaging the changes in a program file. The file is, in the instance of a Windows programming environment an initialization (".ini") file. Lastly the system includes means for transmitting the program file over the network to a destination gaming machines.

The inventive method for controlling content on a plurality of gaming machines coupled over a network includes operating a global content manager program on a computer coupled over the network to the gaming machines. A user would select within the global content manager program one or more of the networked gaming machines from a list of such machines and presenting to an operator of the program operating criteria associated with each machine. The user would modify, for the one or more selected networked gaming machines, the operating criteria to create a set of content manager criteria for the one or more gaming machines. A file, associated with the set of content manager criteria, would then be transmitted over the network to the one or more gaming machines. Finally, the one or more gaming machines would be operated according to the file as by controlling physical parameters of the machines.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 4 is an enlarged partial view of the display of FIG. 3.

FIG. 5 is a right-side view of the display of FIG. 4.

FIG. 6 is a bottom view of the view of FIG. 4.

DETAILED DESCRIPTION

Figure 1:
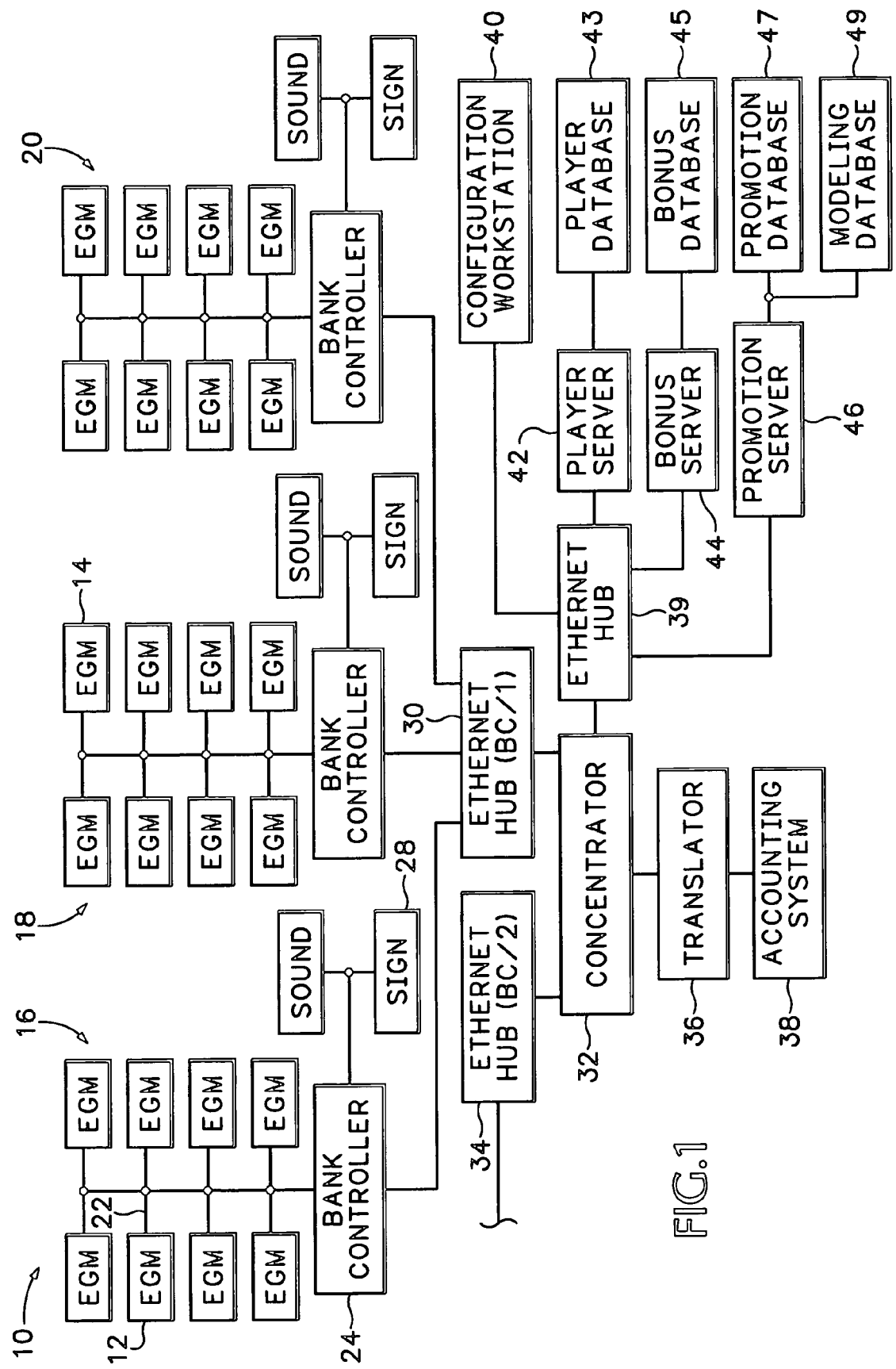
FIG. 1 is a schematic diagram of a plurality of electronic gaming machines interconnected by a computer network to a host computer in accordance with a networked embodiment of the present invention.

Turning now to FIG. 1, indicated generally at 10 is a schematic diagram illustrating electronic gaming machines (EGMs), like EGMs 12, 14, interconnected by a computer network. Included therein are three banks, indicated generally at 16, 18, 20, of EGMs. Each EGM is connected via a network connection, like connection 22, to a bank controller 24. In the present embodiment of the invention, each bank controller comprises a processor that facilitates data communication between the EGMs in its associated bank and the other components on the network. The bank controller may also include a CD ROM drive for transmitting digitized sound effects, such as music and the like, to a speaker 26 responsive to commands issued over the network to bank controller 24. The bank controller may also be connected to an electronic sign 28 that displays information, such as jackpot amounts and the like, visible to players of machines on bank 16. Such displays are generated and changed responsive to commands issued over the network to bank controller 24. Each of the other banks 18, 20 of EGMs include associated bank controllers, speakers, and signs as shown, which operate in substantially the same manner.

Ethernet hub 30 connects each of the bank controllers associated with banks 16, 18, 20 of EGMs to a concentrator 32. Another Ethernet hub 34 connects similar bank controllers (not shown), each associated with an additional bank of EGMs (also not shown), to concentrator 32. The concentrator functions as a data control switch to route data from each of the banks to a translator 36. The translator comprises a compatibility buffer between the concentrator and a proprietary accounting system 38. It functions to place all the data gathered from each of the bank controllers into a format compatible with accounting system 38. In the present embodiment of the invention, translator 38 comprises an Intel Pentium 200 MHz Processor operating Microsoft Windows NT 4.0.

Another Ethernet hub 39 is connected to a configuration workstation 40, a player server 42, a bonus server 44 and a promotion server 46. Hub 39 facilitates data flow to or from the configuration workstation 40 and the servers 42, 44, and 46. Additionally, the servers 42, 44, and 46 communicate through the concentrator 32 to the bank controllers 24, which, in turn, communicate with the particular gaming devices 12.

The configuration workstation 40 has a user interface that allows portions of the network 10 and the servers 42, 44, and 46 to be set up and modified. The configuration workstation 40 could include a personal computer having a keyboard, monitor, microprocessor, memory, an operating system, and a network card coupled to the Ethernet hub 30.

The player server 42 includes a microcomputer that is used to track data of players using the gaming devices 12. The player server 42 is coupled to a player database 43 where the player tracking data is stored. Another function of the player server 42 is to control messages that appear on display 58 associated with each gaming device 12 and the messages on the signs 28 coupled to the bank server 24. The player server 42 may be embodied in a microcomputer including, for instance an Intel Pentium Processor, Microsoft operating system and a network card to couple the server to the Ethernet hub 39.

The bonus server 44 is embodied by a microcomputer and is used to control bonus applications or bonus systems on the gaming network 10. The bonus server 44 is coupled to a database 45 where bonus data is stored. The bonus server 44 implements includes a set of rules for awarding jackpots in excess of those established by the winning pay tables of each gaming device 12. Some bonus awards may be made randomly, while others may be made to link to groups of gaming devices 12 operating in a progressive jackpot mode. Specific examples of such bonuses and networks used to implement them include those as described in U.S. patents mentioned above and previously incorporated, as well as the various implementations described further below.

The promotion server 46 is coupled to a promotion database 47 and a modeling parameters database 49. The promotion server 46 includes functions and processes operative to generate signals to cause a system award to be generated, and to communicate the generated system award to the particular gaming device 12 at which the player receiving the award can receive the award.

Data of different types of system and/or bonus awards and how and when the awards are generated can be stored in the promotion database 47. For instance, the text that is printed on an award, or bar-codes that are printed on the award ticket can be stored on the promotion database 47. Modeling parameters and data can be stored on the modeling parameters database 49. For instance, conditions that when satisfied cause a ticket to be generated can be stored on this database. Such data could include the number of hours a player must play at a requisite coin-in level to cause a complementary meal ticket to be awarded to the player. Many examples of system awards and parameters used to implement them are discussed in detail below.

In determining when to grant a bonus or system award, the promotion server 46 can access data stored anywhere on the network, such as: from any of the databases 43, 45, 47 and 49; from the configuration workstation 40; from the bank controller 24; from the accounting system 38; and from the bonus engine 50 (FIG. 2) on any or all of the gaming devices 12 coupled to the computer network 10. Additionally, the computer network 10 illustrated in FIG. 1 is only an example gaming network. Those skilled in the art will appreciate that embodiments of the invention can operate on any acceptable network, even if it differs from the one illustrated in FIG. 1.

When the promotion server 46 determines that an award should be generated, it sends appropriate signals to the bonus engine 50 of the appropriate gaming device 12 through the gaming network to deliver the award. As discussed above, one such method of award delivery is to cause an award ticket to be printed for the player, but others such as points, cash back, and promotional coupons can also be contemplated. Examples of bonuses that can be implemented on the network are disclosed in co-owned U.S. Pat. No. 6,319,125 (the '125 patent), which is incorporated herein by reference for all purposes. This co-owned patent also describes in more detail features of the network, like that shown in FIG. 1, which may be used to implement the present invention. The '961 patent also discloses bonuses that can be implemented by bonus and promotional servers 44, 46 and a network that could be used to implement the present invention.

As used herein the term jackpot indicates an award made resulting from the pay table on one of the EGMs while the term bonus indicates an award that does not result from the machine's pay table. The '125 patent and '961 patent include many examples of bonuses. The term award is intended to encompass any payment given to a player of one of the EGM's and includes both jackpots and bonuses.

Figure 2:
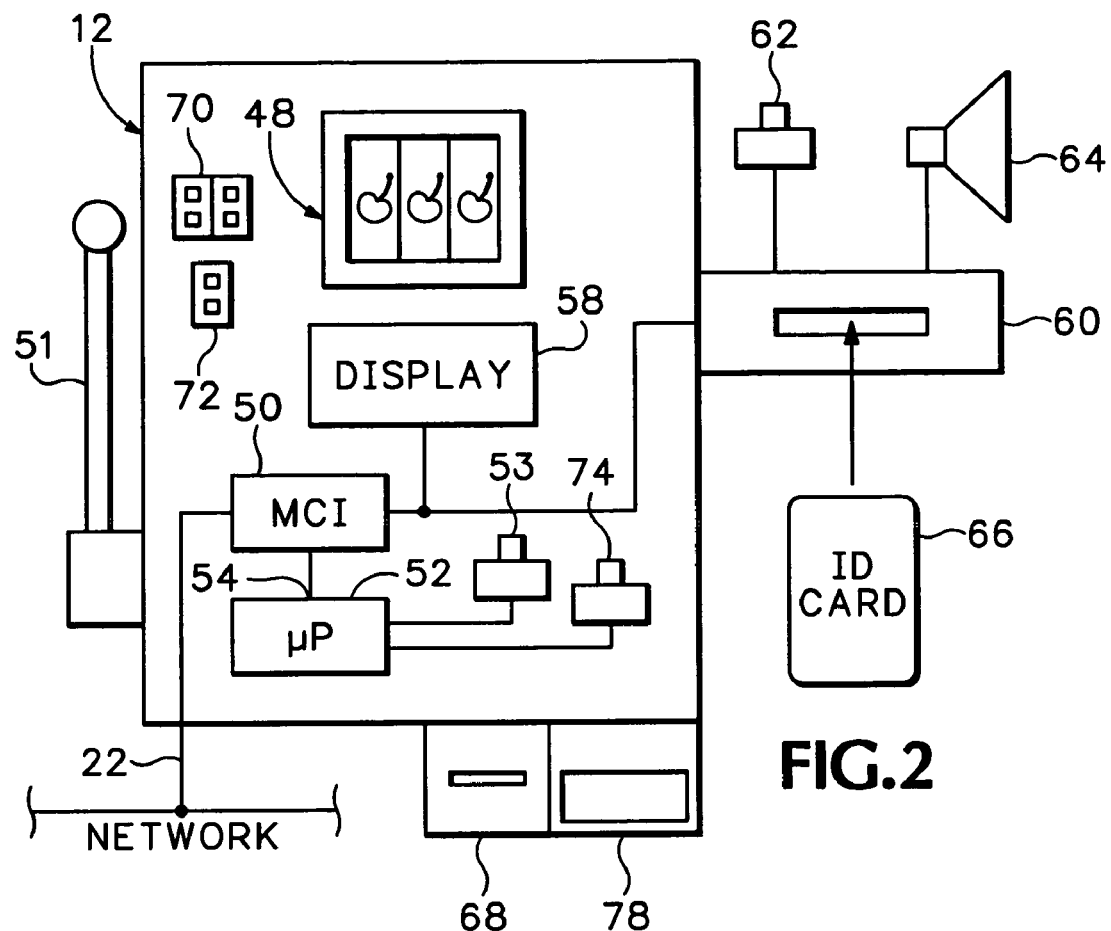
FIG. 2 is a schematic diagram of a slot machine and associated hardware, including the secondary bonus screen for displaying the bonus promotion implemented according to the invention.

FIG. 2 illustrates a gaming machine 12 constructed according to a preferred embodiment of the invention. Included is a highly schematic representation of an electronic slot machine—typical of each of the machines in the network—that incorporates network communications hardware as described hereinafter. This hardware is described in the '961 patent, and is referred to therein as a data communications node. Preferably the network communications hardware is like that disclosed in the '125 patent, namely a machine communication interface (MCI) 50.

MCI 50 facilitates communication between the network, via connection 22, and microprocessor 52, which controls the operation of EGM 12. This communication occurs via a serial port 54 on the microprocessor to which MCI 50 is connected.

Included in EGM 12 are three reels, indicated generally at 48. Each reel includes a plurality of different symbols thereon. The reels spin in response to a pull on handle 51 or actuation of a spin button 53 after a wager is made. In one specific implementation of the bonus, one or all of the reels 48 may include a special bonus initiator symbol which, when obtained on the gaming machine's payline, will cause the MCI 50 to initiate a secondary bonus game or other bonus event as described below. It will be appreciated, of course, that the current invention is not limited to use with physical or virtual reel-based gaming machines and that other machines, such as poker or keno machines, are possible.

MCI 50 includes a random access memory (RAM), which can be used as later described herein. The MCI also facilitates communication between the network and an liquid crystal display (LCD) or vacuum florescent display (VFD) 58, a card reader 60, a player-actuated push button 62, and a speaker 64.

Before describing play according to the invention, a description will first be made of typical play on a slot machine, like EGM 12. A player plays EGM 12 by placing a wager and then pulling handle 51 or depressing spin button 53. The wager may be placed by inserting a bill into a bill acceptor 68. A typical slot machine, like EGM 12, includes a coin acceptor that may also be used by the player to make a wager. Other elements incorporated into the electronic gaming machine 12 include a bill acceptor, coin-in meter, and a credit meter having a numeric display that indicates the total number of credits available for the player to wager. The credits are in the base denomination of the machine. For example, in a nickel slot machine, when a five-dollar bill is inserted into the bill acceptor, a credit of 100 appears on the credit meter. To place a wager, the player depresses a coin-in button, which transfers a credit from the credit meter to a coin-in meter. Each time the button is depressed a single credit transfers to the coin-in meter up to a maximum bet that can be placed on a single play of the machine. In addition, a maximum-bet button may be provided to immediately transfer the maximum number of credits that can be wagered on a single play from the credit meter to the coin-in meter.

When coin-in meter reflects the number of credits that the player intends to wager, the player depresses spin button 53 thereby initiating the base game.

The player may choose to have any jackpot won applied to credit meter 70. When the player wishes to cash out, the player depresses a cash-out button 74, which causes the credits on meter 70 to be paid in coins to the player at a hopper 78, which is part of machine 12. The machine consequently pays to the player, via hopper 78, the number of coins—in the base denomination of the machine—that appear on credit meter 70.

Card reader 60 reads a player-tracking card 66 that is issued by the casino to individual players who choose to have such a card. Card reader 60 and player-tracking card 66 are known in the art, as are player-tracking systems, examples being disclosed in the '961 patent and '125 patent. Briefly summarizing such a system, a player registers with the casino prior to commencing gaming. The casino issues a unique player-tracking card to the player and opens a corresponding player account that is stored on accounting system 38 (in FIG. 1). Accounting system 38 is referred to herein as a host computer. It should be appreciated, however, that the host computer can be distributed on the network and could include multiple processors or memories. The account includes the player's name and mailing address and perhaps other information of interest to the casino in connection with marketing efforts. Prior to playing one of the EGMs in FIG. 1, the player inserts card 66 into reader 60 thus permitting accounting system 38 to track player activity, such as amounts wagered and won and rate of play.

Turning next to FIGS. 3-6, indicated generally at 80 is the upper portion of slot machine 12. The slot machine is a commercially available electronic gaming device that has been modified as described herein.

Figure 9:
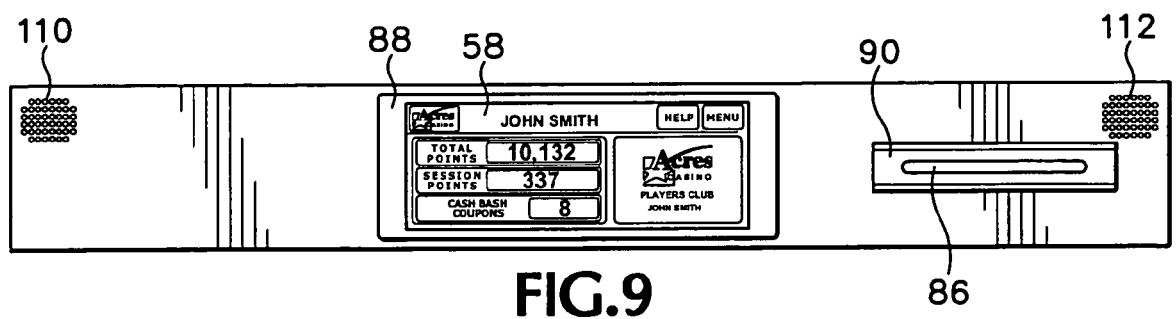
FIG. 9 is a view of the display and card reader on the slot machine of FIG. 3, including an image depicted on the display screen.

One aspect of the modifications to slot machine 12 includes addition of a bracket 82 mounted on the front of the slot machine. The bracket includes two openings, the first containing a 640×240 touch-panel liquid crystal display ("LCD") 58. In the present embodiment of the invention, LCD 58 comprises a Hitachi SX16H005-AZA LCD although it is of course possible to use other types of displays therein. The second opening 84, in FIG. 3, contains a card reader 60 having a slot 86 (visible in FIG. 9), into which a player's card is received as is known in the art. As shown in FIG. 9, both LCD 58 and slot 86 are framed by respective bezels 88, 90. Card reader bezel 90 and slot 86 are shown in FIG. 9.

It is understood that reels 48 in gaming machine 12 could be implemented under control of gaming processor 52 in electronic rather than mechanical form. Additionally, though the preferred embodiment describes a machine having separate elements for reels 48 and display 58, one would understand that such units could be combined in a single display without departing from the concepts embodied herein.

Figure 3:
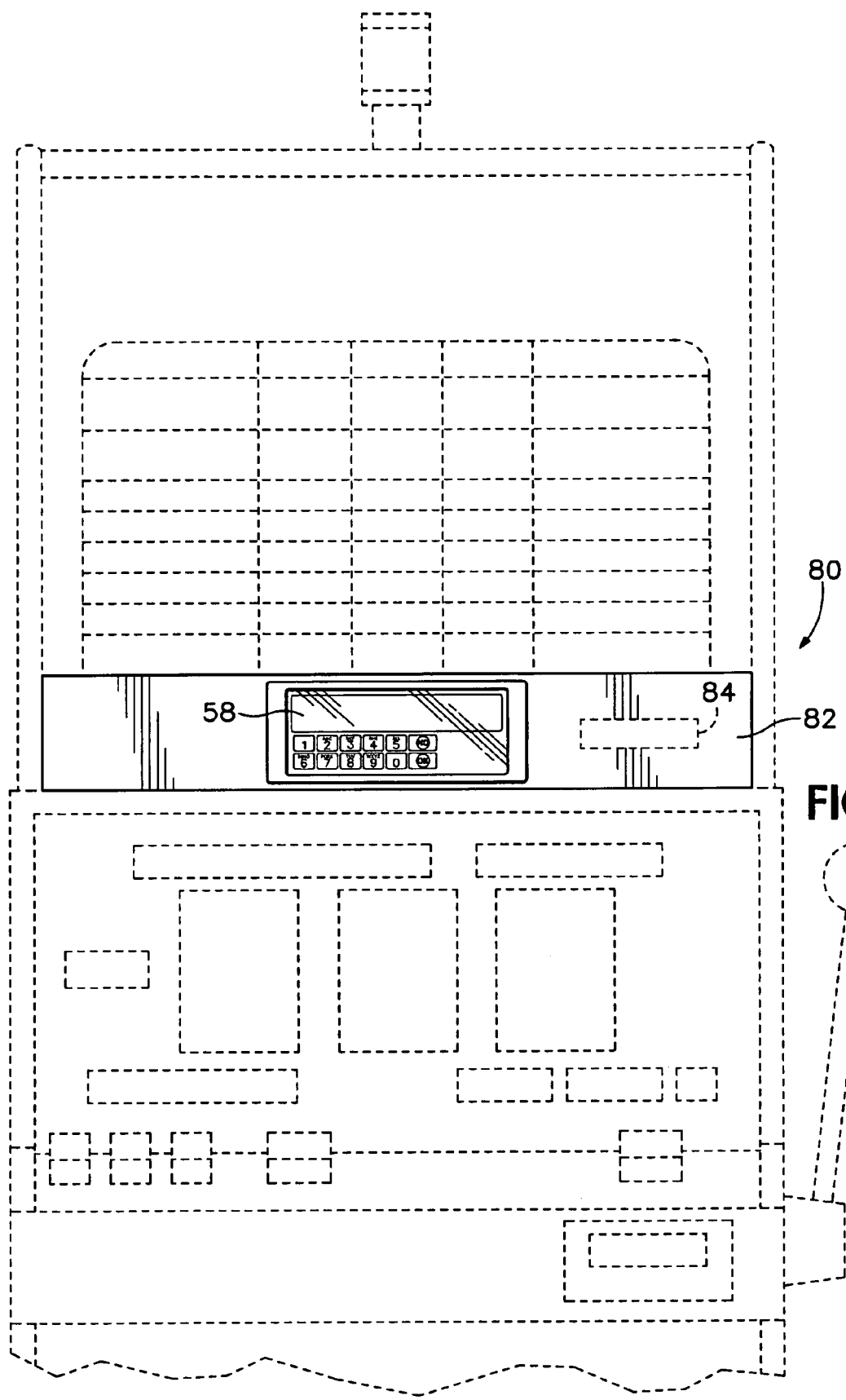
FIG. 3 is a partial view of a slot machine, shown in dashed lines, that is part of an implementation of the present embodiment of the invention, including an interactive display screen and card reader, shown in solid lines.
Figure 7:
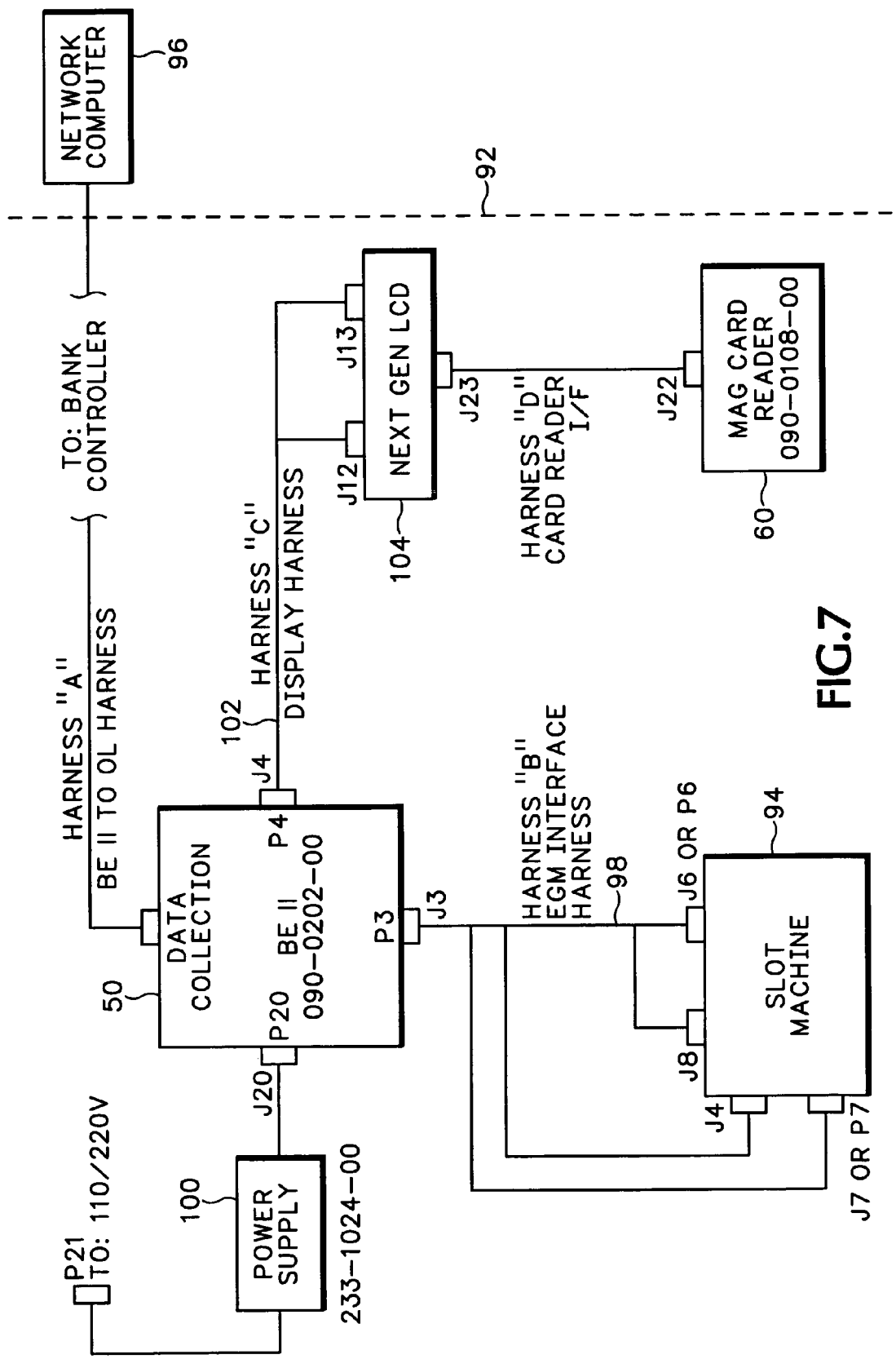
FIG. 7 is a schematic view of the slot machine display and card reader of FIG. 3 depicting the manner in which circuitry associated with each is connected to a network of similar slot machines incorporating displays and card readers.

Turning now to FIG. 7, the schematic components depicted therein on the left side of dashed line 92 are all contained within the cabinet that houses the upper portion 80 of slot machine 12 in FIG. 3. Slot machine electronics 94 is part of the original slot machine structure provided by the slot-machine manufacturer. The additional components on the left side of line 92, however, are all added to implement the invention in association with electronics 94 and the network.

The components within the slot machine, i.e., on the left side of line 92, are connected to a computer network, along with numerous additional slot machines 12, 14 having the related structure depicted in FIG. 7. The network is illustrated as a computer 96 on the right side of dashed line 92. Networked slot machines are known in the art and are depicted in the '961 and '125 patents. The network is shown generally in FIG. 1 and includes databases for storing slot machine transactions within accounting system 38 and player tracking data within player server 42, servers 44,46 for implementing system games and bonuses, and configuration work stations 40 for configuring the system games and bonuses. The network further includes a Content Manager, which is a program implemented on a network computer such as configuration work station 40 that permits an operator of the system, typically a casino, to customize and configure images that appear on display 58.

The slot-machine electronics 94 are connected to a system-machine interface (MCI) board 50 via a wiring harness 98. Board 50 provides communications between the slot machine electronics 94 and network 96 in a manner that is described in the '961 and '125 patents. A power supply 100 provides power to board 50. A wiring harness 102 connects board 50 with the display and associated electronics 104. Another harness connects board 50 to the network including computer 96. The power supply also supplies power to electronics 104 and to a card reader 60. The card reader is behind bezel 90 in FIG. 9 and includes slot 86.

Figure 8:
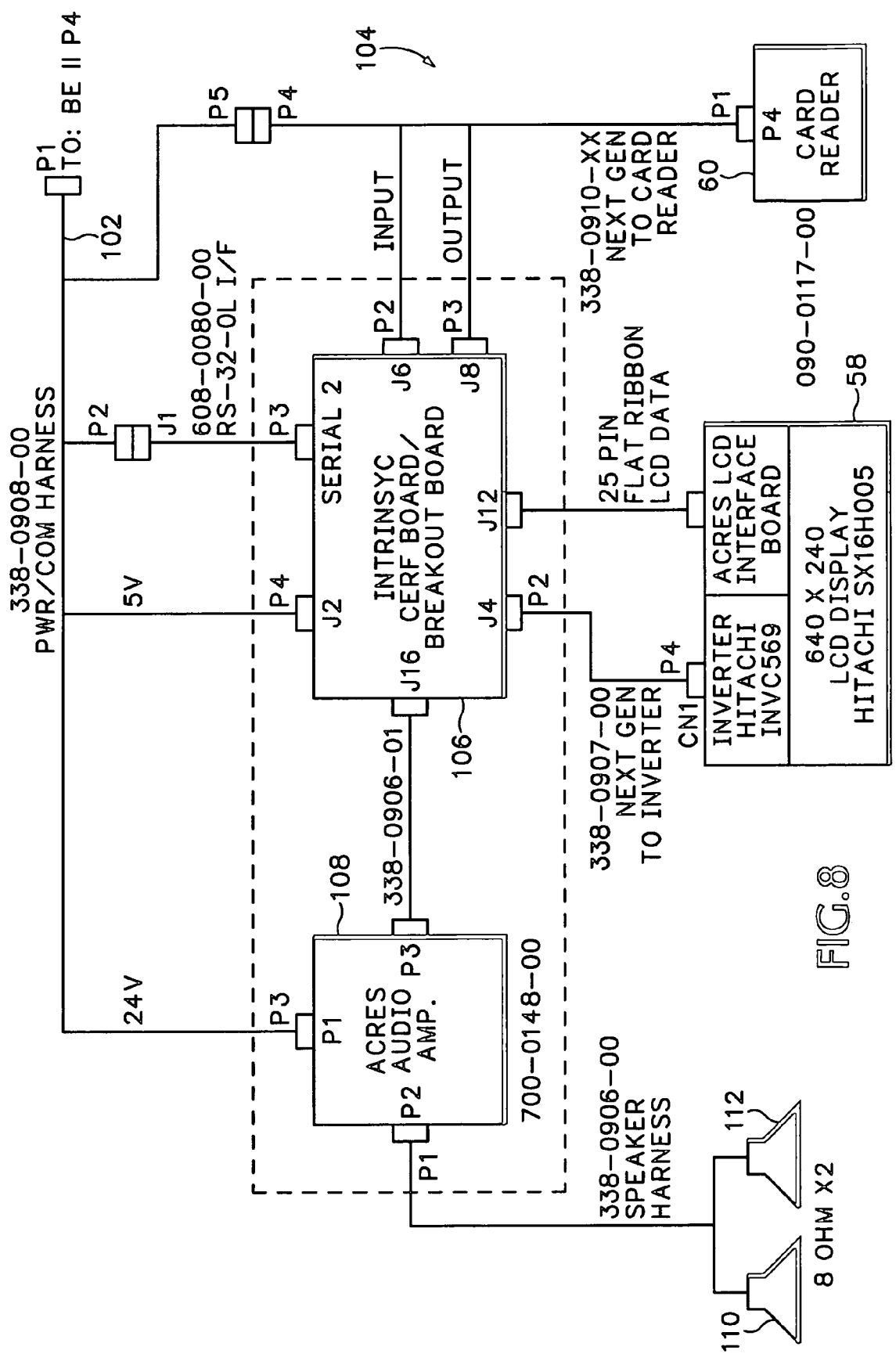
FIG. 8 is a schematic view of the display and related components of FIG. 7.

Turning now to FIG. 8, additional details of the display and associated electronics 104 in FIG. 7 are depicted schematically.

A dedicated computer 106 includes an LCD controller and electronics for enabling VGA touch panel images and sound for LCD 58. In the present embodiment of the invention, computer 106 is a commercially available processor board manufactured by Intrinsyc. It includes an Intel ARM processor and a Windows CE operating system. Computer 106 also includes nonvolatile memory for storing images and sounds that are utilized as described hereinafter. An amplifier 108 provides sound signals to speakers 110, 112, which are partially visible in FIG. 9. It is understood that the system electronics 104 can be wired by those knowledgeable in the art to also or instead utilize the base game speakers 64 (FIG. 2) rather than just dedicated speakers 110, 112.

In the present embodiment of the invention, the networked slot machines are initially configured using the Content Manager, which—in the present embodiment of the invention—runs on the same network PC platform as configuration work station 40 (FIG. 1), and enables files to be downloaded to the system-machine interface board, like board 50, associated with each slot machine. Once the screens and features of individual screens are selected at the Content Manager, an initialization file is created that identifies which MMC files and features have been selected. The configuration workstation can then be used to upload the initialization file and associated MMC files to all the machines, to groups of machines, or even to a single selected machine. These initialization files and associated MMC files are stored in nonvolatile memory in electronics 104. All parameters associated with the audio content and with display 58 can be configured in this manner.

When the desired configuration has been selected within the Content Manager, the resulting .ini file (for Windows systems) is exported to a target file path. The operation of the Content Manager can then be suspended, and the Configuration Workstation 40 activated, and the .ini file is then selected for inclusion into the Configuration Workstation Multimedia File Download Manager, where it is selected and targeted for a group of gaming machines on the casino floor, just as if it were another multimedia content file. As many gaming machine .ini files can be created, for as many gaming machine groups as can be configured in the configuration workstation 40. Machines can be grouped by location, coin-in amounts, type, etc. This ability allows a high degree of selective customization of gaming machine content and control customization, down to the individual machine as an extreme example.

Figure 10:
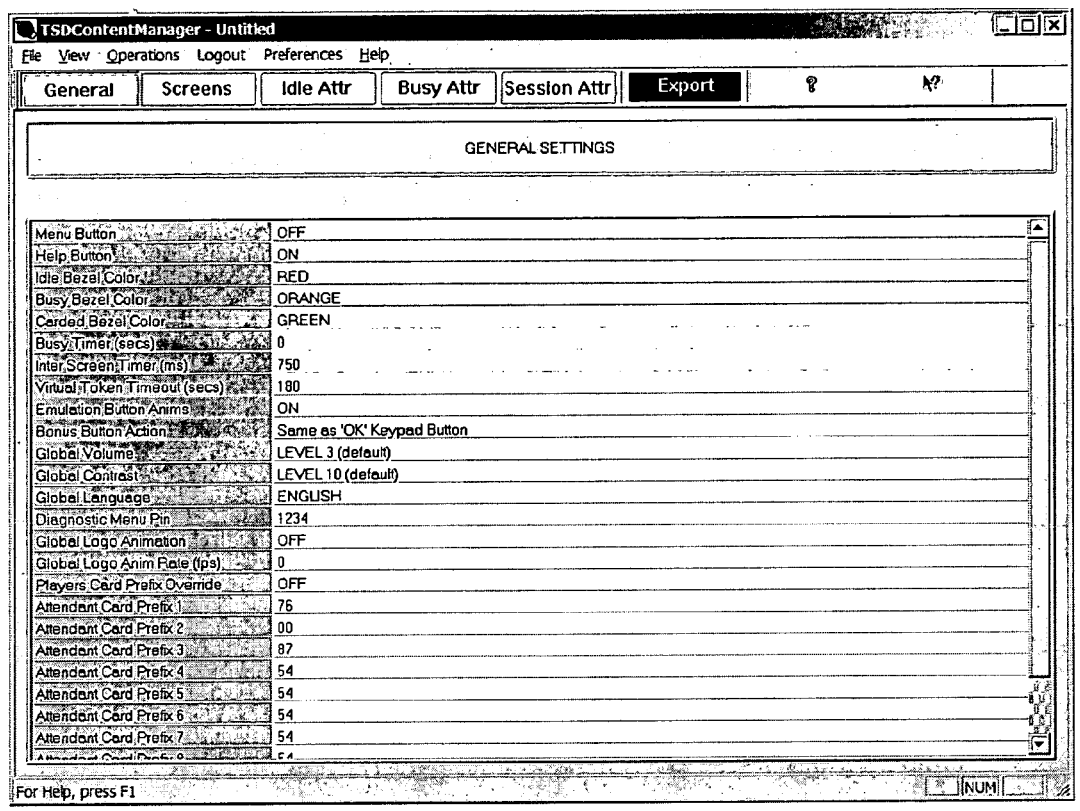
FIGS. 10-20 are enlarged views of display screens of the Content Manager operative on a configuration workstation to implement global control of content and physical parameters of the gaming machines of FIG. 7.

FIG. 10 shows a screen shot graphic of a Content Manager operative according to the present invention. The screen allows selection of various parameters using the General, Screens, Attracts, Busy Attracts, and Session Attracts sub-menu tabs. The function and control offered each is described below. The General settings applied to the gaming machines include several global (physical) parameters such as global volume, global contrast, global language, and global animation.

Figure 11:
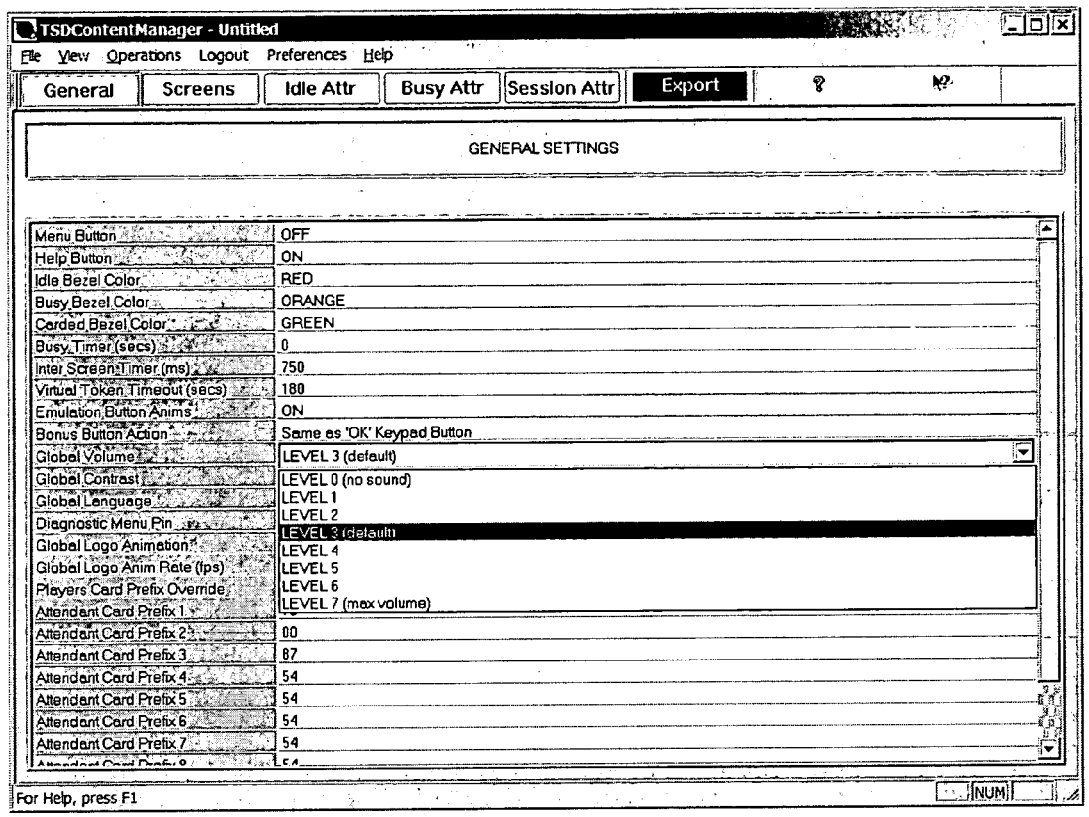

FIG. 11 illustrates the sequence for adjusting the global volume parameter for a group of machines. A user would position the cursor at the configuration workstation 40 and click on the global volume item on the General settings list. A drop down menu would then be presented with several selectable values for global volume. A setting of 'Level 0' signifies no sound and 'Level 7' signifies a maximum volume level with 'Level 3' being the default. Selection of the specified volume and then clicking on the 'Export' button configures and transmits an .ini file to the proper gaming machines which adjust the volume of the gaming machine appropriate to the instruction(s) contained within the received .ini file.

Global volume adjustment is important for several purposes. First, the volume might need to be adjusted during certain times of the day or during certain events. Whereas loud gaming might be appropriate during busy times (e.g. nighttime) to hear over the general noise of the casino floor, loud volume might be less appropriate in the morning when fewer machines are being used. Alternately, selective volume adjustment by location might be appropriate where machines are located in louder (e.g. by a craps table) or lower volume (e.g. near a dining area) locations within the casino.

Figure 12:
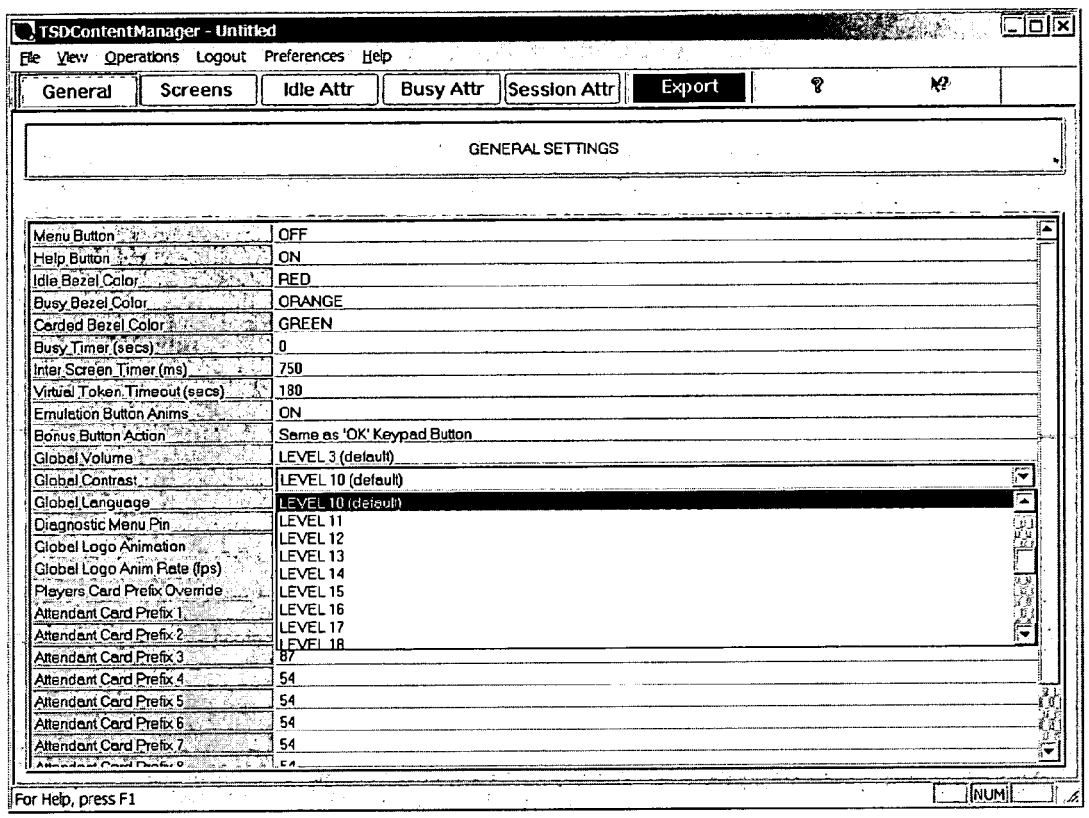

FIG. 12 illustrates the sequence for adjusting a global contrast parameter for a group of machines. A user would position the cursor at the configuration workstation 40 and click on the global contrast item on the General settings list. A drop down menu would then be presented with several selectable values for global contrast. A setting of 'Level 0' signifies no contrast and 'Level 31' of an eight-bit string signifies a maximum contrast level with 'Level 10' being the default. Selection of the specified contrast and then clicking on the 'Export' button configures and transmits an .ini file to the proper gaming machines which adjust the contrast of the gaming machine appropriate to the instruction(s) contained within the received .ini file. Adjustment of the brightness would work the same way.

Global contrast and brightness adjustment is important for several purposes. First, games might be located in different locations where the readability of the display might be affected by the gaming machines' proximity to windows. During daylight hours, the displays at or near those locations would need the contrast parameters turned up while at night those parameters can be set the same as the remainder of the gaming machines. Other contrast issues might have to do with the type of display where some technologies (e.g. plasma, CRT) are brighter than others (e.g. LCD). Alternately, certain displayed items might necessarily require higher contrast to be properly displayed. A card game, for instance, uses graphics where the difference between cards is highly discernable given a reasonable contrast whereas other more graphic-intensive games might use softer color shades that are closer in color to one another and thus might need greater contrast to be seen and appreciated.

Figure 13:
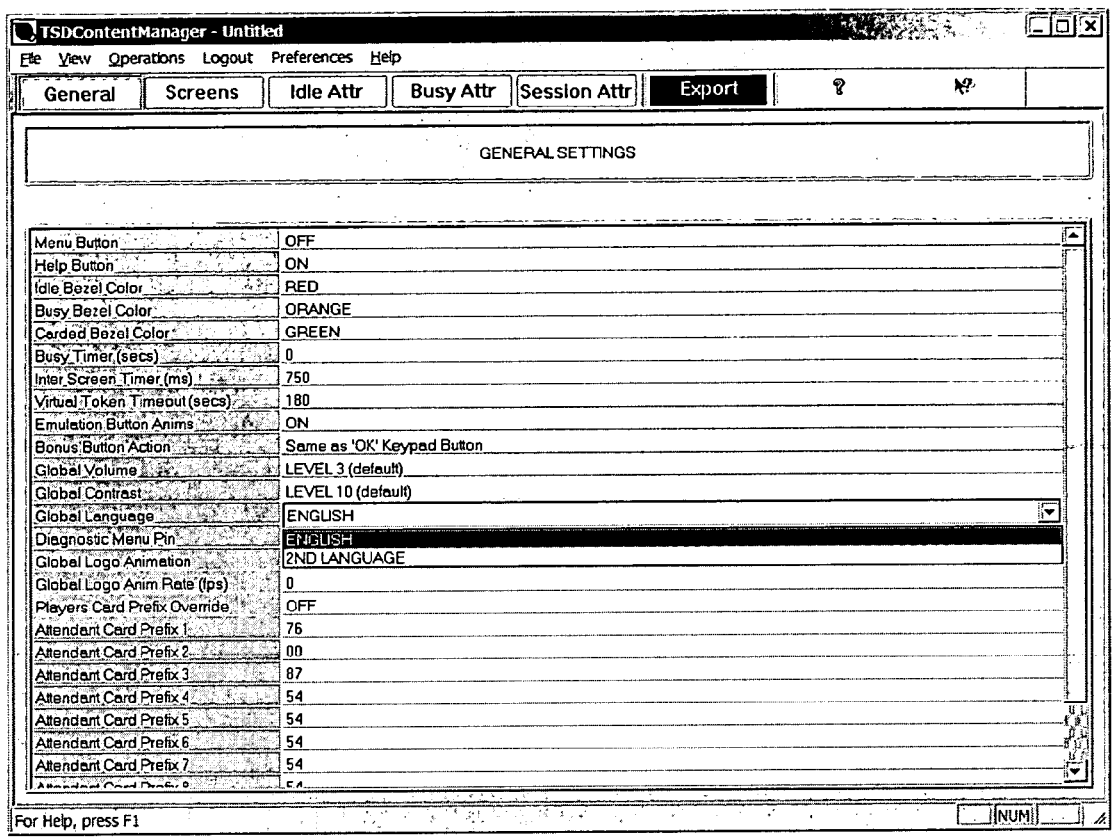

FIG. 13 illustrates the sequence for adjusting the global language used. A drop-down menu allows a user at the configuration workstation 40 to select either English or some other specified language(s) as the language of choice of the group of machines selected.

Figure 14:
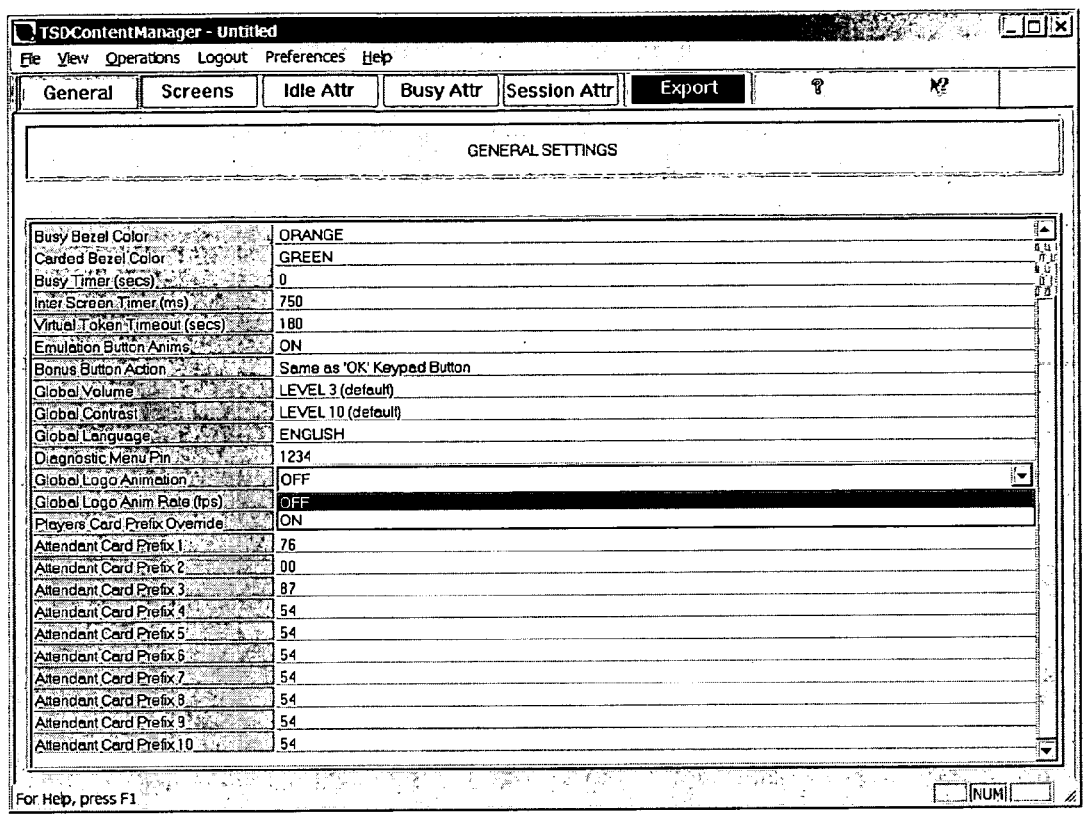

FIG. 14 illustrates the sequence for toggling the animation sequences used on the machines. A drop-down menu allows a user at the configuration workstation 40 to select either 'on' or 'off'.

Figure 15:
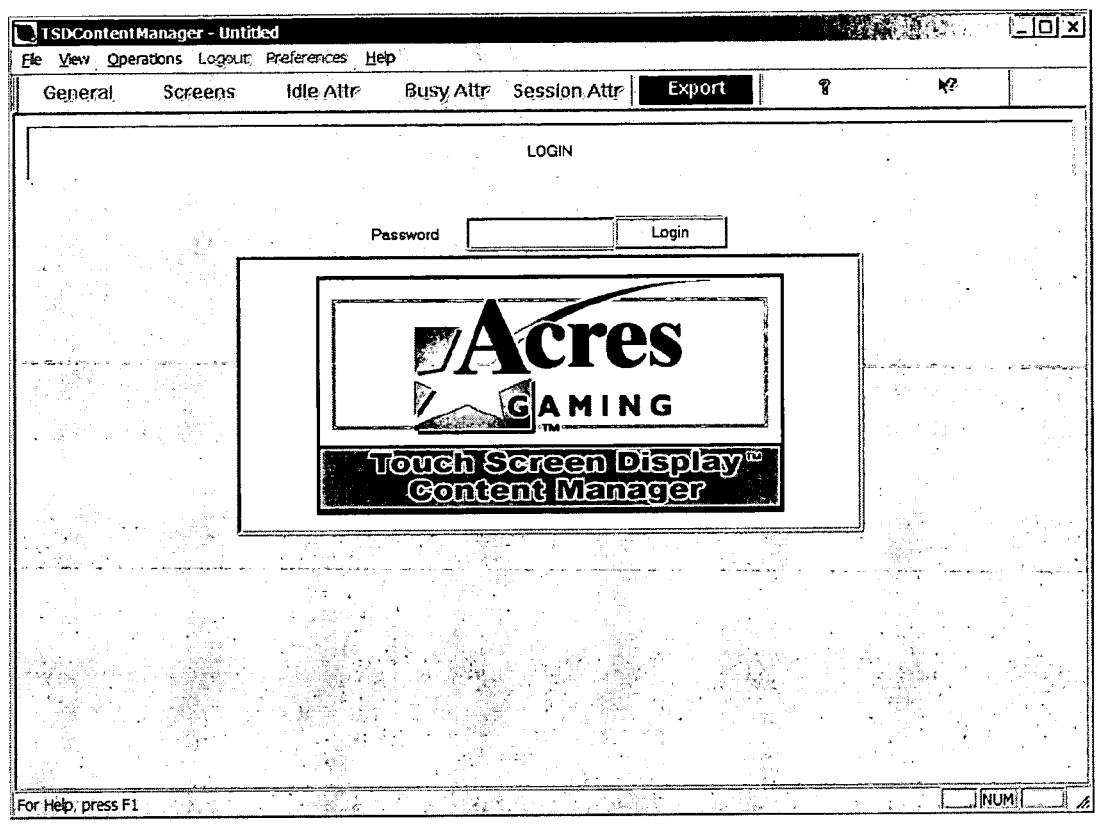
Figure 16:
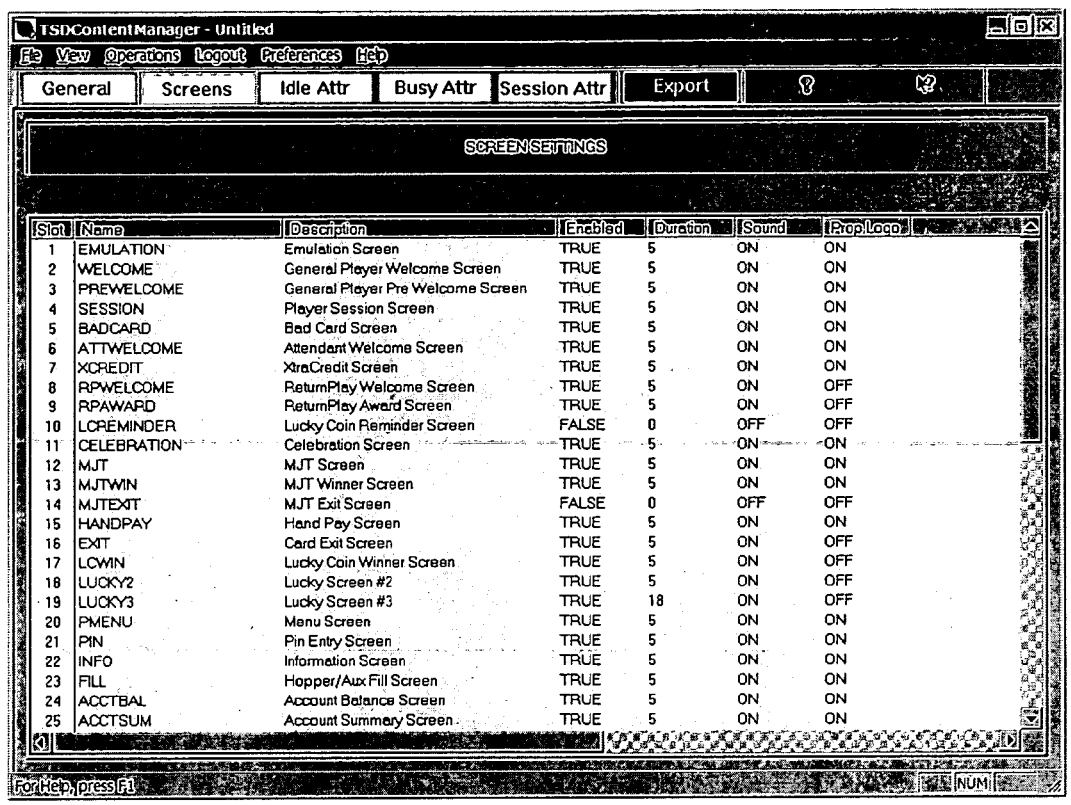

FIGS. 15-20 illustrate other screens operative within the Content Manager program. User login occurs upon startup of the program as shown in FIG. 15. The content and operation of the gaming machine screens can be adjusted using the user interface screens shown in FIG. 16. The idle attract screen operation is designated using the FIG. 17 screen. Double-clicking on any of the machines, such as 'Attr_01', would result in display of a further parameter designation screen FIG. 18. The busy attract screen operations are designated using the FIG. 19 screen. And the session attract screen operations are designated using the FIG. 20 screen.

Figure 17:
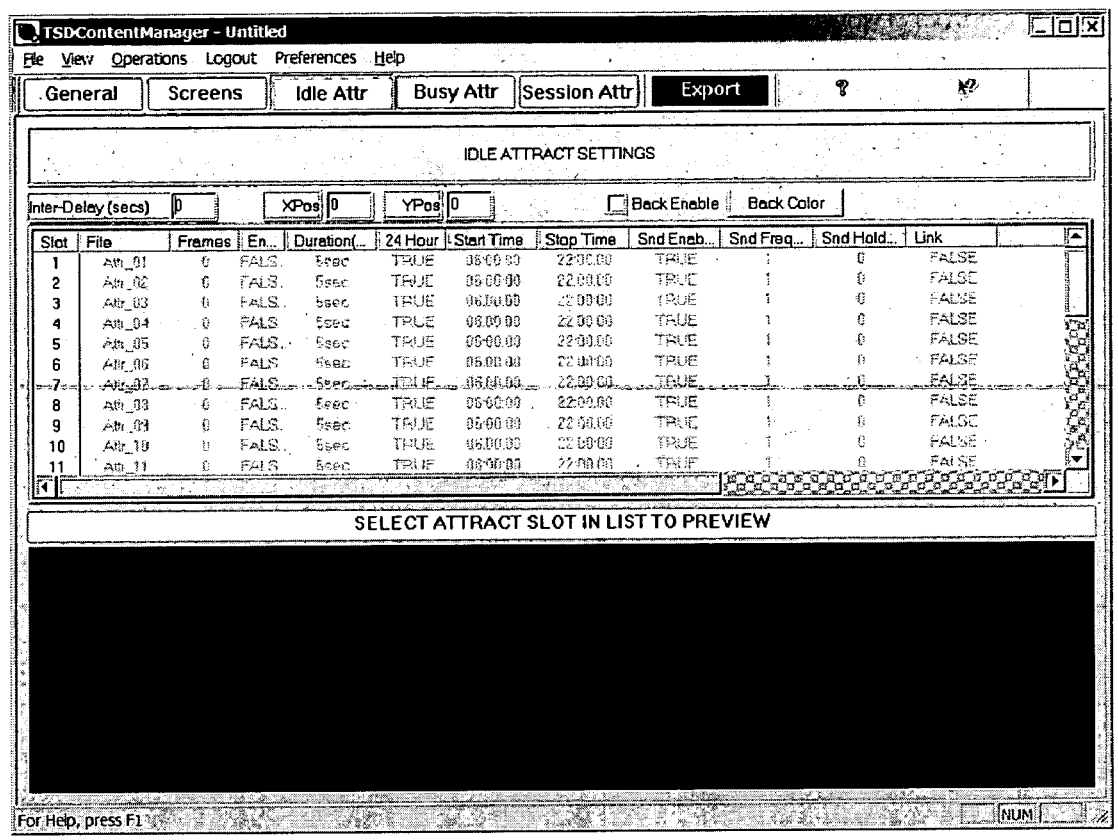
Figure 18:
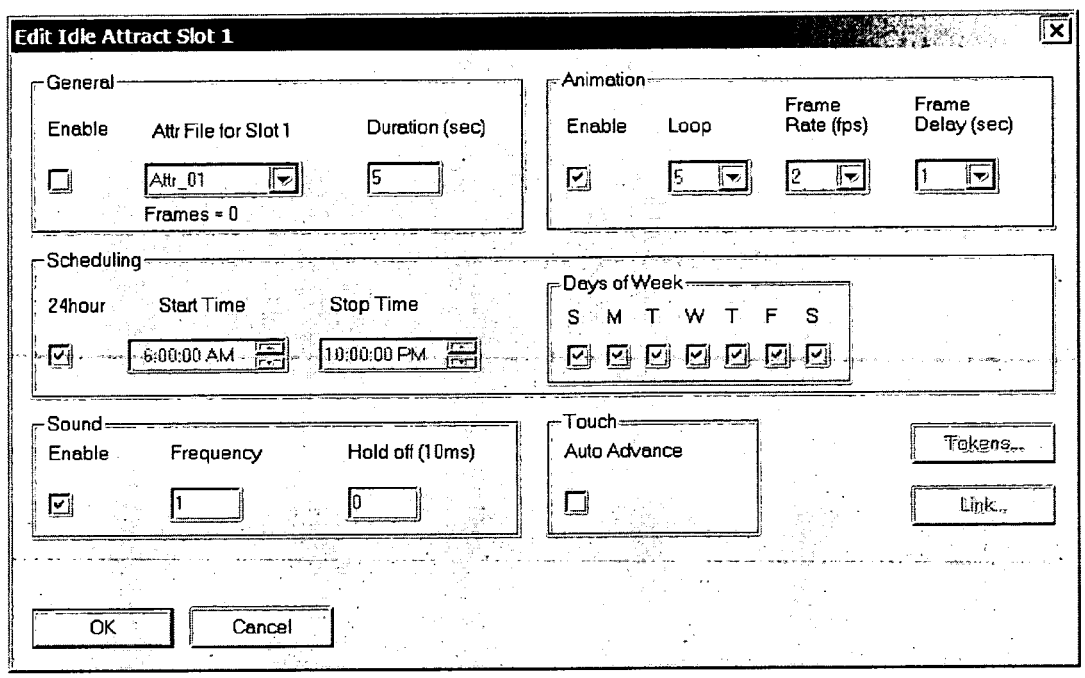
Figure 19:
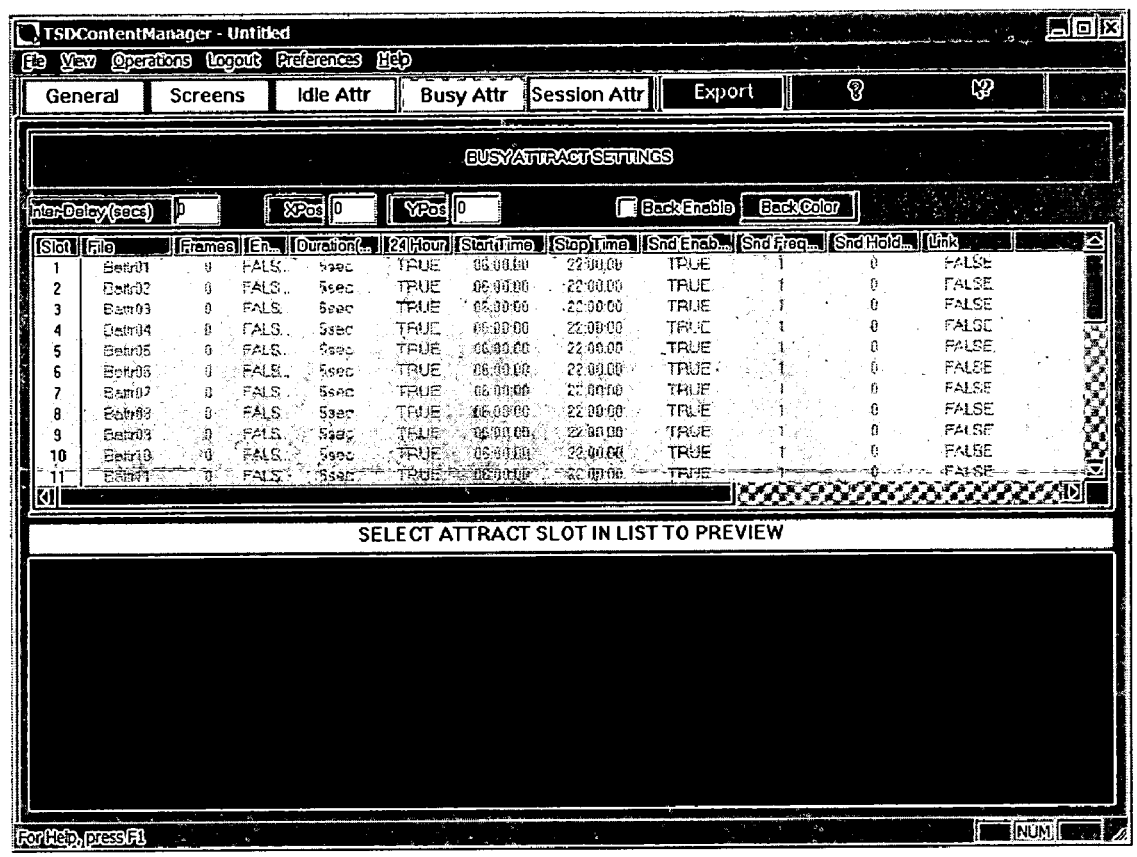
Figure 20:
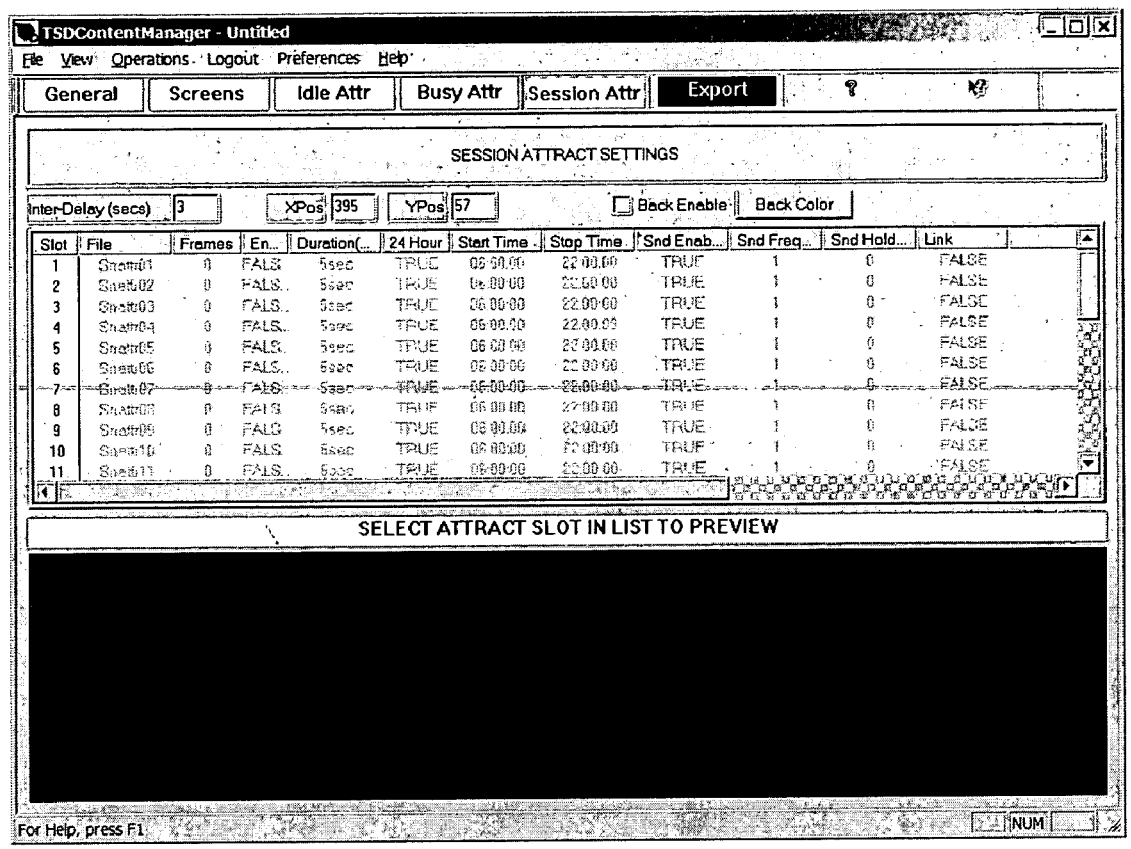

Global values designation and operation are shown with reference to an inter-attract time example—that is, where the gaming machine display is instructed to show video or other types of signals in succession. The content manager is used to configure each of the attraction screen options such as duration, time-of-day, sound, sound counter, and sound hold off delay. The attraction screens may be played with the duration as short as 1-second to implement low speed animation. The inter-attract time is controlled globally in the content manager Attract configuration window. If that value is zero, as shown in FIGS. 17 and 19, attracts will play back-to back; if the inter-attract time value is non-zero, as shown by the FIG. 20 setting, the Emulation mode screen will appear between Attract screens. In the absence of any enabled idle-attract mode MMC, the gaming machine display will default to emulation mode screen.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A method for controlling content on a plurality of gaming machines coupled over a network, the method comprising the steps of:
   operating a global content manager program on a computer coupled over the network to the gaming machines;
   enabling simultaneous selection of more than one of the networked gaming machines, selecting within the global content manager program a group of the gaming machines from a list of such machines wherein the group of gaming machines is selected based on at least one of coin-in amount, game display type, ambient environmental condition and time of day, and presenting to an operator of the program operating criteria associated with the group of gaming machines wherein the operating criteria includes sound volume level of an audio output of a gaming machine, and brightness level, contrast level and language type of a display of a gaming machine;
   modifying for the group of gaming machines the operating criteria to create a set of content manager criteria for the group of gaming machines;
   transmitting a file over the network to the the group of gaming machines, said file associated with the set of content manager criteria; and
   operating the group of gaming machines according to the file.

2. The method of claim 1, wherein the file transmitted over the network to the group of gaming machines is an .ini file.

3. The method of claim 1, wherein the step of operating the group of gaming machines according to the file includes adjusting a sound volume setting on one or more gaming machines.

4. The method of claim 1, wherein the step of operating the group of gaming machines according to the file includes adjusting a display contrast setting on one or more gaming machines.

5. The method of claim 1, wherein the step of operating the group of gaming machines according to the file includes adjusting a brightness control setting on one or more gaming machines.

6. The method of claim 1, wherein the list of such machines includes one or more groups comprising more than one of the networked gaming machines, the method further comprising presenting to the user for selection the one or more groups within the list, and enabling selection of all networked gaming machines within a group responsive to selection of the group from the list by a user.

7. The method of claim 1, wherein the operating criteria includes global animation.

8. A global content manager system operable within an environment consisting of a plurality of gaming machines coupled together over a network, the system comprising:
   a content manager having operating thereon a program including a plurality of selectable operating criteria wherein the operating criteria includes volume level of an audio output of a gaming machine, and brightness level, contrast level and language type of a display of a gaming machine;
   selection means coupled to the content manager for selecting a group of the gaming machines and one or more operating criteria associated with the group of gaming machines and packaging the changes in a program file wherein the group of gaming machines is selected based on coin-in amount, game display type, ambient environmental condition or time of day; and
   means for transmitting the program file over the network to the group of gaming machines.

9. The system of claim 8, wherein the operating criteria further includes global animation.

10. The system of claim 8, the selection means including means for simultaneously selecting a group of gaming machines.

* * * * *